US009083815B2

(12) United States Patent  (10) Patent No.: US 9,083,815 B2
Bhalekar et al.  (45) Date of Patent: Jul. 14, 2015

(54) SYSTEM AND METHOD FOR ACCOUNT SETUP FOR MOBILE DEVICES, SUCH AS AN E-MAIL ACCOUNT SETUP

(75) Inventors: Aniruddha Bhalekar, Bellevue, WA (US); Murtaza Penwala, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 862 days.

(21) Appl. No.: 12/115,531

(22) Filed: May 5, 2008

(65) Prior Publication Data

US 2009/0093242 A1  Apr. 9, 2009

Related U.S. Application Data

(60) Provisional application No. 60/927,632, filed on May 3, 2007.

(51) Int. Cl.
*H04M 3/00* (2006.01)
*H04M 1/725* (2006.01)

(52) U.S. Cl.
CPC ...... *H04M 1/72552* (2013.01); *H04M 1/72563* (2013.01)

(58) Field of Classification Search
CPC ........ H04W 4/20; H04W 4/203; H04L 61/10; H04L 61/1552; H04L 61/1564
USPC .................................. 455/418; 709/214, 206
See application file for complete search history.

(56) References Cited

U.S. PATENT DOCUMENTS

| 7,218,926 | B2 * | 5/2007 | Bocking et al. | 455/419 |
| 7,395,313 | B2 * | 7/2008 | Ketola | 709/206 |
| 7,450,932 | B2 * | 11/2008 | Yabe et al. | 455/413 |
| 2004/0242205 | A1 * | 12/2004 | Yamane et al. | 455/412.1 |
| 2004/0254996 | A1 * | 12/2004 | Yabe et al. | 709/206 |
| 2005/0033847 | A1 * | 2/2005 | Roy | 709/227 |
| 2005/0075115 | A1 * | 4/2005 | Corneille et al. | 455/456.3 |
| 2005/0114652 | A1 * | 5/2005 | Swedor et al. | 713/156 |
| 2005/0164691 | A1 * | 7/2005 | Payne | 455/419 |
| 2006/0129628 | A1 * | 6/2006 | Kamiya et al. | 709/203 |
| 2006/0136561 | A1 * | 6/2006 | Lee | 709/206 |
| 2007/0027955 | A1 * | 2/2007 | Voss et al. | 709/206 |
| 2012/0254169 | A1 * | 10/2012 | Landsman et al. | 707/736 |

* cited by examiner

*Primary Examiner* — Christopher M Brandt
*Assistant Examiner* — Joseph Dean, Jr.
(74) *Attorney, Agent, or Firm* — Kenyon & Kenyon LLP

(57) ABSTRACT

A mobile communication device includes a display configured to provide a graphical user interface, a memory configured to store computer program instructions and a communication-setup database having setup information associated with each of a plurality of different communication account types, and a processor configured to execute the computer program instructions to provide a communication-setup client via the graphical user interface. The communication-setup client enables a user to perform an initial setup of a plurality of different communication account types on the mobile communication device, and subsequent easy access to the communication-setup database to provide access to a specific desired communications client within a limited amount of clicks or data entries.

23 Claims, 14 Drawing Sheets

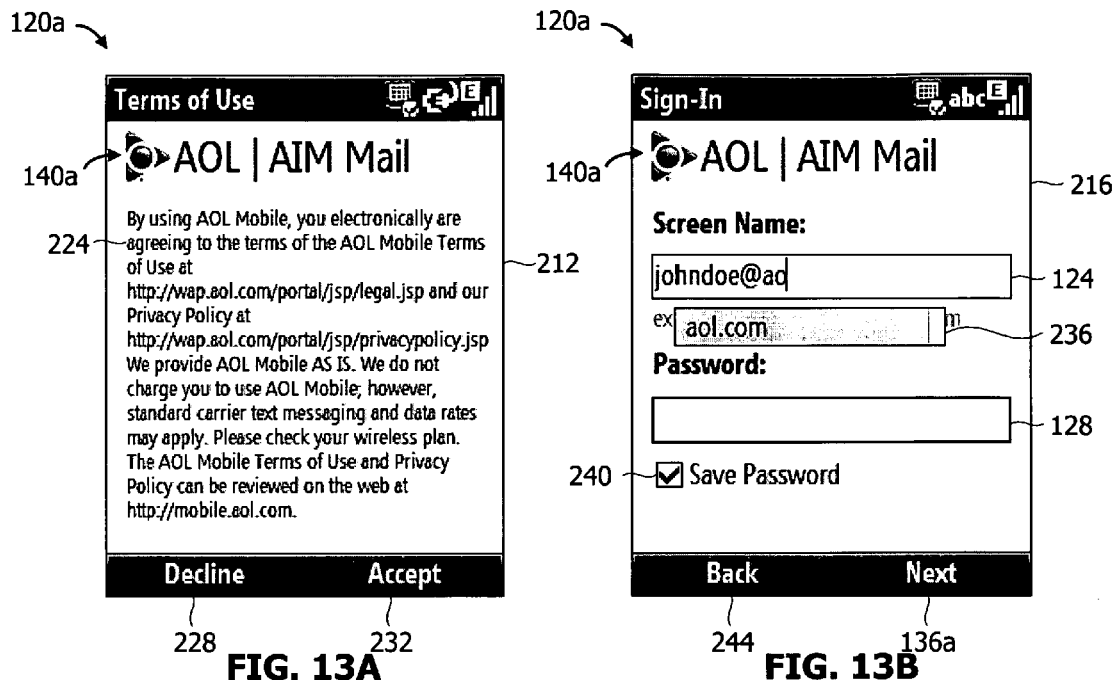
FIG. 13A
FIG. 13B
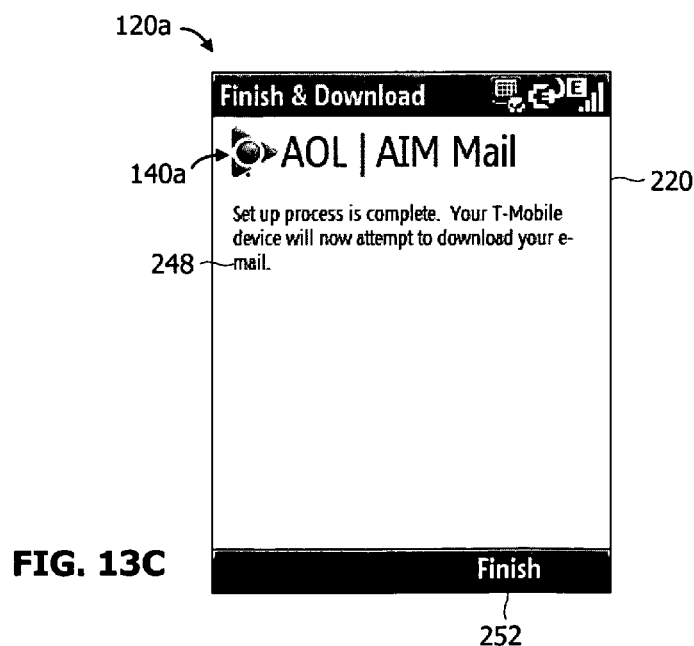
FIG. 13C

SYSTEM AND METHOD FOR ACCOUNT SETUP FOR MOBILE DEVICES, SUCH AS AN E-MAIL ACCOUNT SETUP

CROSS-REFERENCE TO RELATED APPLICATIONS

This application claims priority to U.S. Provisional Patent Application No. 60/927,632, to Aniruddha Bhalekar and Murtaza Penwala, filed on May 3, 2007, entitled "Method and System for Automated E-Mail Setup of Multiple Account Types Accessed Via a Single Initiating Interface," which is herein incorporated by reference in its entirety.

BACKGROUND INFORMATION

Mobile communication devices can provide access to various forms of content such as text communication, including, for example, electronic mail (e-mail), blog content, instant-messages, social networking content, and other content in addition to voice communication, from a wide variety of locations. This functionality can be useful and enjoyable for many different types of users, including business and casual users alike. Present embodiments of mobile communication devices equipped for both voice and content have had deficiencies that have limited their acceptance and usefulness with users.

In some earlier devices, the setting up of the mobile device to access a plurality of different content account types, such as e-mail, has been complicated and onerous. For example, some mobile devices require the user to navigate to several different starting applications in a graphical user interface to respectively set up each of several different e-mail account types. In a further example specific to e-mail, the user is required on some mobile communications devices operating the Windows Mobile operating system to navigate to an e-mail setup client specific to Exchange ActiveSync to set up an e-mail account type associated with Microsoft Outlook, then to navigate to another e-mail setup client specific to Windows Live to set up an e-mail account type associated with Microsoft Hotmail, and then to navigate to still yet another e-mail setup client to set up an e-mail account type associated with other e-mail service providers such as, for example, AOL/AIM Mail, Gmail, and Yahoo. Further yet, for some mobile communications devices, it is not even possible to set up such different types of e-mail accounts. As a result of such complicated setup procedures, users may decide to not set up content accounts on their mobile communication devices, or at least to not set up a plurality of different types of accounts, thus, undesirably sacrificing the usefulness and enjoyment associated with mobile content services.

In some earlier devices, the setup procedure associated with any particular e-mail account type itself has been complicated and onerous. For example, an available setup procedure of a previous embodiment required the user to enter a number of different pieces of technical information, such as incoming and outgoing e-mail server addresses and other pieces of information. However, a user may not know such technical information and therefore may become sufficiently confused or dispirited during the setup procedure that the user either quits or does not successfully complete the setup, thus sacrificing the usefulness and enjoyment associated with mobile e-mail.

BRIEF DESCRIPTION OF THE DRAWINGS

The drawings illustrate some embodiments of the invention, and are therefore not to be considered limiting of its scope, for the invention may encompass other embodiments.

FIGS. 13A, 13B and 13C depict embodiments of the graphical user interface displaying elements of the setup interface of the one-stop e-mail setup client during an AOL/AIM Mail account-type setup.

DETAILED DESCRIPTION OF EXAMPLE EMBODIMENTS

Embodiments of the present invention simplify the setting up of content, e.g., communication accounts. For example, a non-exhaustive list of categories of communication accounts which may be set up on a device, alone or in combination with other accounts of the same or a different type and/or with other accounts of the same or different communication account category, according to exemplary embodiments of the present invention include e-mail accounts, blog accounts, instant-messaging accounts, and social-networking accounts. The various account categories may require differing set-up procedures and, even within a single account category, there may be different account types which require different set-up procedures and/or different set-up information. Embodiments of the present information may simplify the set-up of the various account types and categories and may take into account the differences in the set-up procedures and/or information for the different account types and categories.

Various embodiments of the invention will now be described. The following description provides specific details for a thorough understanding and an enabling description of these embodiments. One skilled in the art will understand, however, that although the invention is described in connection with an e-mail accounts setup embodiment, the invention may be applied to setup any type of content account on a mobile device. One skilled in the art will further understand that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Figure 1:
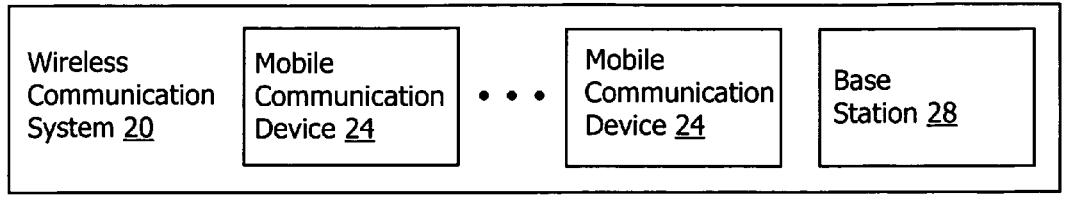
FIG. 1 depicts an embodiment of a wireless communication system.

FIG. 1 depicts an embodiment of a wireless communication system 20 capable of providing voice communication and content. The depicted wireless communication system 20 includes a plurality of mobile communication devices 24 and a base station 28. Each of the mobile communication devices 24 (e.g., 24a ... 24n) is capable of communicating wirelessly with the base station 28, and vice versa. Generally speaking, the mobile communication devices 24 are associated with users having variable locations, and the base station 28 has a fixed location. The wireless communication system 20 can optionally include a plurality of the base stations 28. The depicted wireless communication system 20 can also optionally communicate with other communication systems. For example, the mobile communication devices 24 can be configured to communicate with other communication devices, such as other mobile communication devices 24 in other wireless communication systems 20 or other fixed communication devices in other types of communication systems, by communicating with the base station 28, which can be configured to then communicate with other communication systems. The mobile communication devices 24 can optionally be configured to communicate directly with each other.

Figure 2:
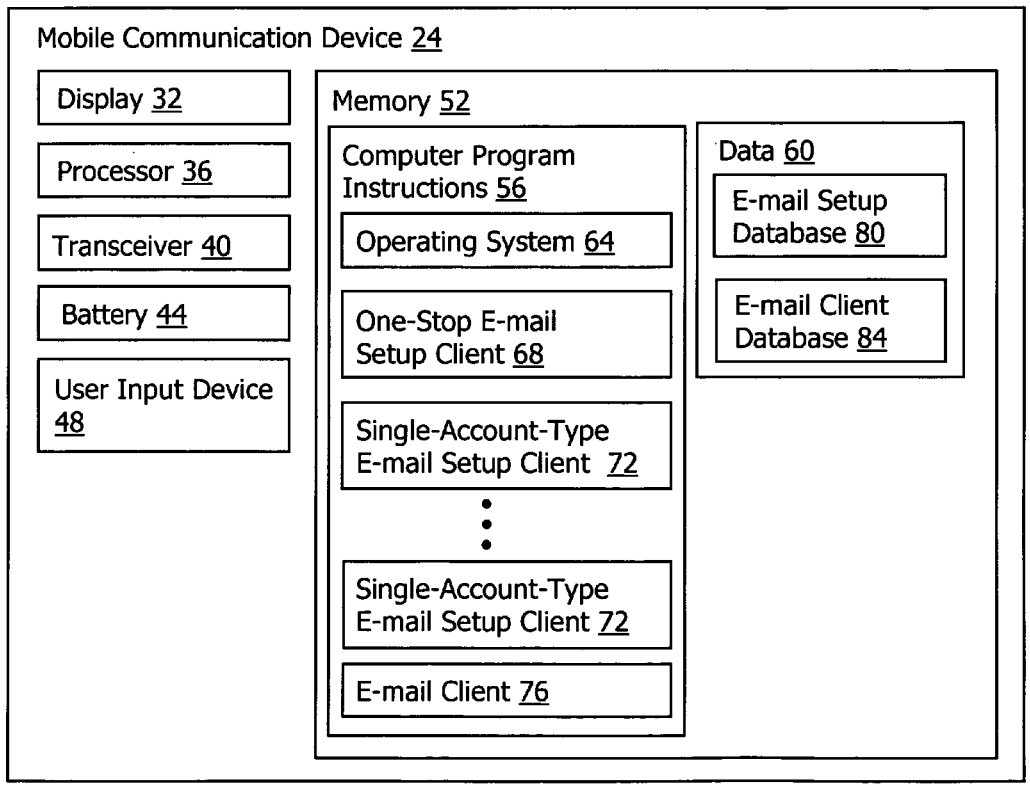
FIG. 2 depicts an embodiment of a mobile communication device of the wireless communication system.

FIG. 2 depicts an embodiment of the mobile communication device 24 capable of providing both voice communication and e-mail in association with the wireless communication system 20. The ease of some embodiments of the present invention allows for a mobile communication device 24 which is portable, e.g., hand carried, and may be useable by a user using one or both hands. The mobile communication device 24 may be for example, at least one of a mobile telephone, a cellular telephone, a portable processor having internet and/or telephone access, a smart phone, a PDA, an iPhone device, a BlackBerry device, or other such devices.

Figure 3:
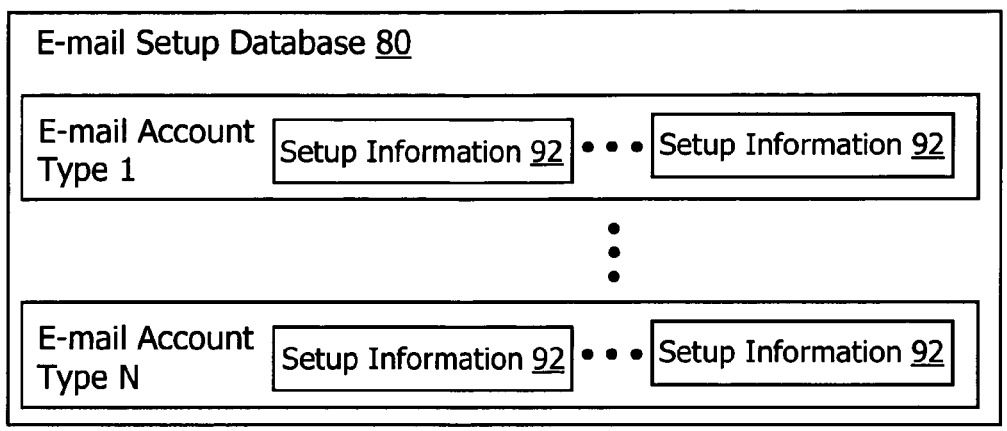
FIG. 3 depicts an embodiment of an e-mail setup database of the mobile communication device.

The depicted mobile communication device 24 includes a display 32, a processor 36, a transceiver 40, a battery 44, a user input device 48, and a memory 52 configured to store computer program instructions 56 and data 60. The display 32 is configured to display a graphical user interface (for example, as shown in FIG. 3), which includes graphics and text, to the user. An embodiment of the display 32 may include an LCD display. The processor 36 is configured to access and execute the computer program instructions 56 stored in the memory 52, and access and process the data 60 also stored in the memory 52. The mobile communication device 24 can optionally include a plurality of the processors 36, each differentiated to execute different computer program instructions 56 to perform different functionalities. Embodiments of the processor 36 can include a microprocessor, a digital signal processor, and a controller.

The transceiver 40 is configured to communicate data between the mobile communication device 24 and the base station 28, or between a first mobile communication device 24 and a second (or more) mobile communication device 24, to enable voice and/or e-mail communication. The transceiver 40 may communicate according to a variety of different wireless standards, including but not limited to GSM, GPRS, UMTS, Wi-Fi or any other available standard. The mobile communication device 24 can optionally include a plurality of transceivers 40 (or other components) such as, for example, a first transceiver 40 configured to operate according to one communication standard, and a second transceiver 40 configured to operate according to a different communication standard. The battery 44, which may be rechargeable or disposable, provides power to the mobile communication device 24. The user input device 48 receives input from the user before and during voice and e-mail communication. The mobile communication device 24 can optionally include a plurality of user input devices 48 configured to receive a plurality of different types of user input. For example, the user input device 48 can include buttons configured to receive textual input from the user during e-mail communication. An embodiment of such a user input device can include an alphanumeric keypad having a plurality of buttons. The user input device 48 may also include a microphone configured to receive sonic input from the user during voice communication.

The memory 52 is configured to store the computer program instructions 56 that are executed by the processor 36, and the data 60 that is accessed and processed by the processor 36. The memory 52 can additionally and optionally also store new computer program instructions 56 and data 60 provided by the user, for example, via the user input device 48, or provided via communication by the transceiver 40 between the mobile communication device 24 and the base station 28 or between two different mobile communication devices 24. In FIG. 2, the computer program instructions 56 stored in the memory 52 include a plurality of different sets of computer program instructions, including a set of computer program instructions configured to be executed by the processor 36 to provide an operating system 64, a set of computer program instructions configured to be executed by the processor 36 to provide a one-stop e-mail setup client 68, a plurality of different sets of computer program instructions configured to be executed by the processor 36 to provide a plurality of different single-account-type e-mail setup clients 72, and a set of computer program instructions configured to be executed by the processor 36 to provide an e-mail client 76.

The operating system 64 is configured to provide an execution environment of the processor 36 in which other applications, such as the one-stop e-mail setup client 68, the plurality of different single-account-type e-mail setup clients 72, and the e-mail client 76 can run. The processor 36 can be configured to first execute the computer program instructions of the operating system 64, and then subsequently execute the computer program instructions of the other applications while the computer program instructions of the operating system 64 are still executing. Exemplary embodiments of the operating system 64 can include Microsoft Windows Mobile, Google Android, Apple OS X, Symbian OS, and Palm OS. Each of the other sets of computer program instructions of FIG. 2, including the set executed to provide the one-stop e-mail setup client 68, the set(s) executed to provide the plurality of different single-account-type e-mail setup clients 72, and the set(s) executed to provide the e-mail client 76, can be configured to be independently executable by the processor 36 while the operating system 64 is being executed.

The one-stop e-mail setup client 68 can be configured to provide a single starting point, i.e., a single application, for the user to perform the initial setup of a plurality of different e-mail account types on the mobile communication device 24. Present mobile communication devices require the user to use a plurality of different applications to perform the initial setup of the plurality of different e-mail account types, if such was even possible, with mobile communication devices. In the embodiment of the present invention of FIG. 2, however, the user can perform the initial setup of the plurality of different e-mail account types using just the one-stop e-mail setup client 68. In a further embodiment of FIG. 2, the user can optionally perform the initial setup of every e-mail account type with which the mobile communication device 24 is capable of performing e-mail communication. The simplification of the initial setup procedure, and ease of use, afforded by the one-stop e-mail setup client 68 allows the user to confidently and quickly perform the initial setup of the plurality of different e-mail account types, thus ensuring that the user does actually use mobile e-mail associated with the plurality of different e-mail account types, rather than deciding not to perform the initial setup and undesirably sacrifice the potential usefulness and enjoyment associated with mobile e-mail.

Each of the single-account-type e-mail setup clients 72 can be configured to enable the user to perform the initial setup of a single e-mail account type. In previous mobile communication devices, directly using a plurality of single-account-type applications by the user was the typical means available to the user to perform the initial setup of a plurality of different e-mail account types. In the embodiment of FIG. 2, in addition to functionality that may have been present in the single-account-type applications of previous mobile communication devices, the single-account-type e-mail setup clients 72 (e.g., 72a . . . 72n) can be configured to be capable of communicating with the one-stop e-mail setup client 68. Likewise, the one-stop e-mail setup client 68 is configured to communicate with each of the plurality of single-account-type e-mail setup clients 72. Such communication between the one-stop e-mail setup client 68 and the plurality of single-account-type e-mail setup clients 72 is useable in some embodiments to enable the performance of the initial setup of the plurality of different e-mail account types using the one-stop e-mail setup client 68.

The e-mail client 76 is configured to enable the user to send, receive, view and compose e-mails in association with the plurality of different e-mail account types. In FIG. 2, the mobile communication device 24 includes a single set of instructions executable to provide a single setup e-mail client 76 to operate in association with each of the plurality of different e-mail account types. Other embodiments, however, optionally include a plurality of different sets of instructions executable to provide a plurality of different e-mail clients 76. The one-stop e-mail setup client 68 is configured to optionally launch, i.e., begin execution of, the e-mail client 76 upon completion of the initial setup of each of the plurality of e-mail account types.

In FIG. 2, the memory 52 stores data 60 including an e-mail setup database 80 and an e-mail client database 84. The e-mail setup database 80 stores default e-mail account setup information for each of the plurality of e-mail account types. FIG. 3 depicts an embodiment of the e-mail setup database 80. For each of the plurality of different e-mail account types, the default setup information stored in the e-mail setup database 80 includes a plurality of pieces of setup information 92. This default set of setup information 92 for each e-mail type can be accessed by the one-stop e-mail setup client 68 during the performance of the initial setup of the plurality of different e-mail account types.

The e-mail client database 84 stores e-mail account setup information 92 of e-mail accounts that have already been set up on the mobile communication device 24. The one-stop e-mail setup client 68 can be configured to store a specific set of setup information 92 associated with an e-mail account type in the e-mail client database 84 to set up that e-mail account. The e-mail client 76, when performing e-mail communication in association with the specific e-mail account, accesses the e-mail client database 84 to determine the setup information 92 associated with that specific e-mail account. The e-mail client 76 can then use this setup information 92 to perform the e-mail communication in association with that e-mail account.

The setup information 92, stored in various forms in both the e-mail setup database 80 and the e-mail client database 84, can be used to define the differences between the plurality of different e-mail account types.

The setup information 92 may include information that is used by the e-mail client 76 to communicate with incoming and outgoing e-mail servers. For example, the incoming e-mail server is a server, located external to the mobile communication device 24, that collects e-mail, originating from various locations, that is addressed to a particular e-mail account set up, or to be set up, on the mobile communication device 24. The outgoing e-mail server is a server, located external to the mobile communication device 24, that receives e-mail sent from an e-mail account on the mobile communication device 24 to the environment external to the device 24. Both the incoming and outgoing e-mail servers have addresses that indicate where they are located. Communication between the mobile communication device 24 and the incoming and outgoing e-mail servers can be performed according to an e-mail communication standard such as, for example, Internet Message Access Protocol (IMAP), Post Office Protocol 3 (POP3), Simple Mail Transfer Protocol (SMTP), or any other available e-mail protocol. Communication between the mobile communication device 24 and the incoming and outgoing e-mail servers may also be associated with a communication port number. The communication port number identifies a location in or portion of a computer that hosts the incoming or outgoing e-mail servers. Communication between the mobile communication device 24 and the incoming and outgoing e-mail servers can also be associated with a security protocol that provides some type of encryption to the communication, such as, for example, Secure Sockets Layer (SSL).

E-mail communication requires an authentication process to be performed by the user. Authentication is to be performed prior to communication between the e-mail client 76 and the incoming e-mail server. Such an authentication process may include, for example, the e-mail client 76 communicating a user name and password to the incoming e-mail server prior to retrieving new e-mail. Authentication may be performed prior to communication between the e-mail client 76 and the outgoing e-mail server. Such an authentication process may involve the e-mail client communicating a user name and password to the outgoing e-mail server prior to sending new e-mail. The user name and password associated with the incoming e-mail server authentication process can be either the same or different than those associated with the outgoing e-mail server authentication process.

The setup information 92 may include information related to how the e-mail client 76 should operate in association with an e-mail account. For example, such information can include an option that indicates how often the e-mail client 76 should check the incoming e-mail server for new e-mail. Such information may also include an option indicating an amount of new e-mail the e-mail client 76 should retrieve when there is new e-mail on the incoming e-mail server. For example, this option may indicate that the e-mail client 76 should retrieve all of the new e-mails in their entirety, or only a certain portion (for example, the sender name and address, the subject heading, and a few lines of the body of the e-mail) of all of the new e-mails, or only a certain portion of some of the new e-mails, etc.

The e-mail account setup information 92 stored in the e-mail setup database 80 for each e-mail account type can include some or all of the setup information 92 discussed above. In an embodiment, the e-mail setup information 92 stored in the e-mail setup database 80 for each e-mail account type can include at least a plurality of the following pieces of setup information 92: the incoming e-mail server address, the incoming e-mail server protocol, the incoming e-mail server port, the outgoing e-mail server address, the outgoing e-mail server protocol, the outgoing e-mail server port, an option indicating whether to use Secure Sockets Layer (SSL) when communicating with the incoming e-mail server, an option indicating whether to use Secure Sockets Layer (SSL) when communicating with the outgoing e-mail server, an option indicating whether the outgoing e-mail server requires authentication, an option indicating how often to check the incoming e-mail server for new e-mail, or an option indicating a portion of new e-mail to retrieve when there is new e-mail on the incoming e-mail server.

The setup information 92 associated with e-mail account types can be used to define the differences between the plurality of different e-mail account types. The e-mail setup database 80 stores a default set of setup information 92 for each e-mail account type. Once an e-mail account of a specific e-mail account type has been set up, using the one-stop e-mail setup client 68, the e-mail client database 84 stores the actual set of setup information 92 used in association with that e-mail account. In the process of setting up an e-mail account using the one-stop e-mail setup client 68, which is described in further detail below, the one-stop e-mail setup client 68 can optionally modify, i.e., add to, delete from, or change, the default set of setup information 92 stored for a particular account type in the e-mail setup database 80 to create the set of setup information 92 stored in the e-mail client database 84.

The e-mail account type can be defined according to the setup information 92 stored for that e-mail account type in the e-mail setup database 80. In one embodiment, a first e-mail account type is different than a second e-mail account type if the two e-mail account types are associated with different sets of setup information 92 stored in the e-mail setup database 80. An e-mail account type can also be defined according to a specific piece or pieces of the setup information 92 stored for that e-mail account type in the e-mail setup database 80. That is, in an embodiment, the first e-mail account type is different than the second e-mail account type if the specific part or parts of setup information 92 stored in the e-mail setup database 80 for the first e-mail account type is different than the corresponding part(s) of setup information 92 stored in the e-mail setup database 80 for the second e-mail account type. One part of setup information 92 that can be used to define different e-mail account types is the incoming e-mail server address. Another part of setup information 92 that can be used to define different e-mail account types is the outgoing e-mail server address. A combination of the incoming and outgoing e-mail server addresses can also be used to define specific e-mail account types.

Figure 4:
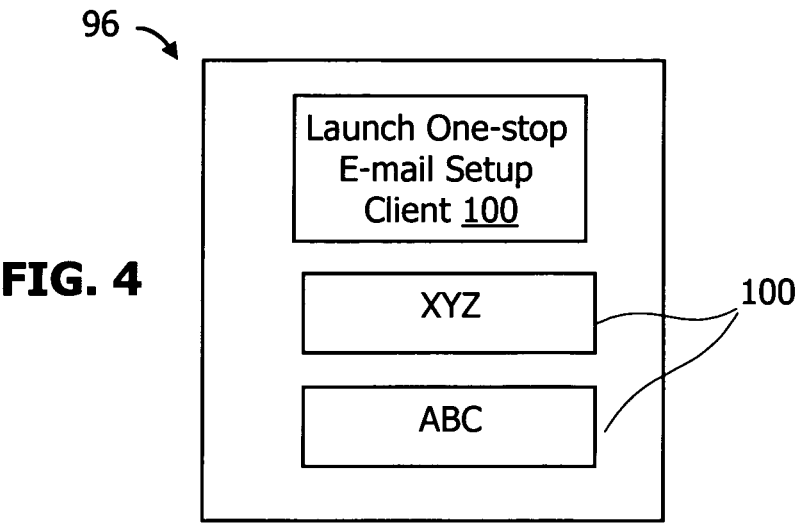
FIG. 4 depicts an embodiment of a graphical user interface, of the mobile communication device, displaying elements of an operating system.

FIG. 4 depicts an embodiment of the graphical user interface 96 as displayed on the display 32 of the mobile communication device 24, during the process of the initial setup of the plurality of different e-mail account types, before the launch, i.e., execution of the computer program instructions of, the one-stop e-mail setup client 68. The depicted graphical user interface 96 is generated by the operating system 64 as it is executed by the processor 36, and includes an e-mail setup launch element 100 that is selectable by the user, via the user input device 48, to launch, i.e., begin execution of the computer program instruction of, the one-stop e-mail setup client 68. The launch element 100 may be displayed along with other elements 101 which are native to the operating system 64.

Figure 5:
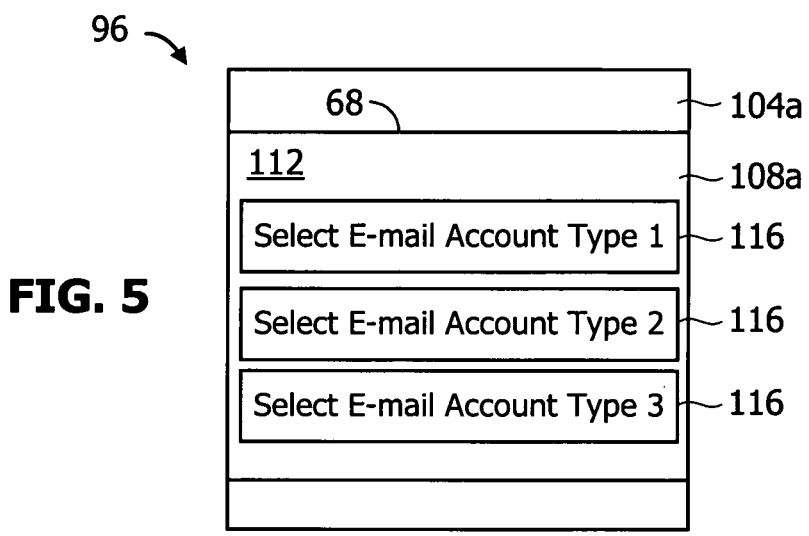
FIG. 5 depicts an embodiment of the graphical user interface displaying elements of an e-mail account-type selection interface of a one-stop e-mail setup client.

FIG. 5 depicts an embodiment of an e-mail account-type selection interface 112 generated by the one-stop e-mail setup client 68 upon launch as part of the graphical user interface 96 after the user has selected the e-mail setup launch element 100. The e-mail account-type selection interface 112 includes a plurality of e-mail account-type selection elements 116. In FIG. 5, the graphical user interface 96 includes a portion 104*a* that is generated by the operating system 64 and a portion 108*a* that is at least partially generated by the one-stop e-mail setup client 68, and three different e-mail account-type selection elements 116 are displayed. Each e-mail account-type selection element 116 enables the user to select for initial setup a particular e-mail account type associated with that selection element 116. The number of e-mail account-type selection elements 116 corresponds to the number of e-mail account types the one-stop e-mail setup client 68 is capable of setting up. The one-stop e-mail setup client 68 can optionally be configured to perform the initial setup of every account type with which the mobile communication device 24 is capable of performing e-mail communication in association, and in such an embodiment the e-mail account-type selection interface 112 can include an e-mail account-type selection element 116 associated with each of the e-mail account types in association with which the mobile communication device 24 is capable of performing e-mail communication.

Figure 6:
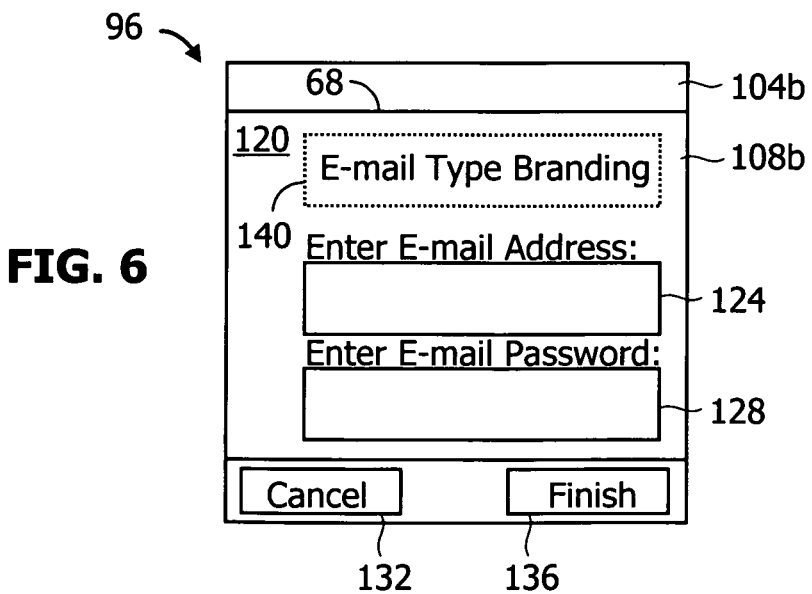
FIG. 6 depicts an embodiment of the graphical user interface displaying elements of a setup interface for one of a plurality of different e-mail account types.

FIG. 6 depicts an embodiment of a setup interface 120 generated by the one-stop e-mail setup client 68 upon selection of any particular one of the e-mail account-type selection elements 116 depicted in FIG. 5. The graphical user interface 96 again includes a portion 104*b* generated by the operating system 64 and a portion 108*b* at least partially generated by the one-stop e-mail setup client 68. The depicted setup interface 120 includes two setup information entry elements, including an e-mail address entry element 124 and a password entry element 128. The user can enter the e-mail address and password, in the e-mail address entry element 124 and the password entry element 128 using the user input device 48, of the e-mail account of the selected e-mail account type of which the user wishes to perform the initial setup. The depicted setup interface 120 also includes a plurality of application control elements, including a cancel control element 132 and an execute, i.e., finish, control element 136, that are selectable by the user using the user input device 48. Selection of the cancel control element 132 cancels the initial setup operation being performed by the user using the one-stop e-mail setup client 68. Selection of the execute control element 136 instructs the one-stop e-mail setup client 68 to complete the initial setup operation using the e-mail address and password entered by the user. Upon completion of the initial setup of an e-mail account of the selected account type, the one-stop e-mail setup client 68 can automatically launch, i.e., begin execution of the computer program instructions of, the e-mail client 76 to perform e-mail communication with the set up account.

Other embodiments of the setup interface 120 can include more setup information entry elements than the two depicted in FIG. 6. However, the simplicity of having only two setup information entry elements, for example, the e-mail address entry element 124 and the password entry element 128, may be desirable. Having only a limited number, e.g., two, setup information entry elements can free the user from the complicated and onerous task of entering many different parts of setup information 92, which the user may not know or may not feel comfortable dealing with, during the setup process. This can make the setup process for the plurality of different e-mail account types easy and quick in comparison to previous mobile communication devices, facilitating completion by the user of the setup process of the plurality of different e-mail account types on the mobile communication device 24 and enabling the user to achieve the usefulness and enjoyment of mobile e-mail.

The setup interface 120 depicted in FIG. 6, embodiments of which can be used during the setup of the plurality of different e-mail account types, includes a branding element 140 associated with the particular e-mail account type that is being set up. The branding element 140 can include a graphical branding element, such as a picture or logo typically associated with a particular e-mail account type. The presence of the branding element 140 may provide ease and confidence to the user during the setup process due to the comforting presence of a familiar brand logo, and thus encouraging the user to continue and complete the setup process that may otherwise have been intimidating on previous mobile communication devices.

Figure 7:
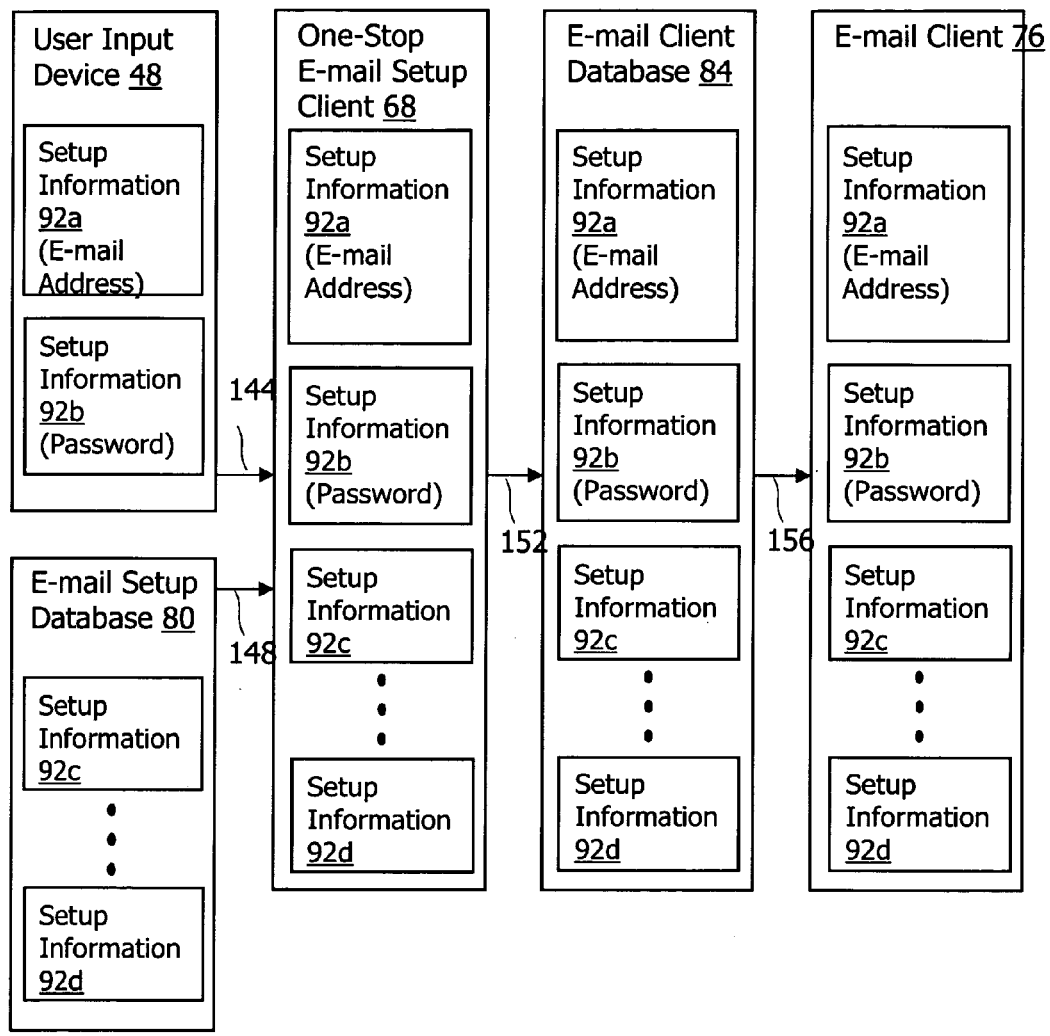
FIG. 7 depicts an embodiment of data flows during an initial setup of the plurality of different e-mail account types using the one-stop e-mail setup client.

FIG. 7 is a data flowchart depicting one embodiment of data flows during the setup process for the plurality of different e-mail account types using the one-stop e-mail setup client 68. In the embodiment, a first data flow 144, including setup information 92a including the e-mail address and setup information 92b including the password, occurs from the user input device 48 to the one-stop e-mail setup client 68 as a result of the one-stop e-mail setup client 68 querying the user for, and the user entering, the e-mail address and password. A second data flow 148, including a plurality of other parts, or pieces, of setup information 92 including a first part of additional setup information 92c potentially up to an Nth part of additional setup information 92d, occurs from the e-mail setup database 80 to the one-stop e-mail setup client 68 as a result of the one-stop e-mail setup client 68 querying the e-mail setup database 80 for, and being provided by the e-mail setup database 80 to, the plurality of other parts of setup information 92c, 92d. A third data flow 152, including the e-mail address and password setup information 92a, 92b and the plurality of additional parts of setup information 92c, 92d, occurs from the one-stop e-mail setup client 68 to the e-mail client database 84 as a result of the one-stop e-mail setup client 68 setting up an e-mail account for one of the plurality of different e-mail account types. A fourth data flow 156, including the e-mail address and password setup information 92a, 92b and the plurality of additional parts of setup information 92c, 92d, occurs from the e-mail client database 84 to the e-mail client 76 as a result of the e-mail client 76 performing e-mail communication for a particular e-mail account created during the setup process for the plurality of different e-mail account types.

Figure 8:
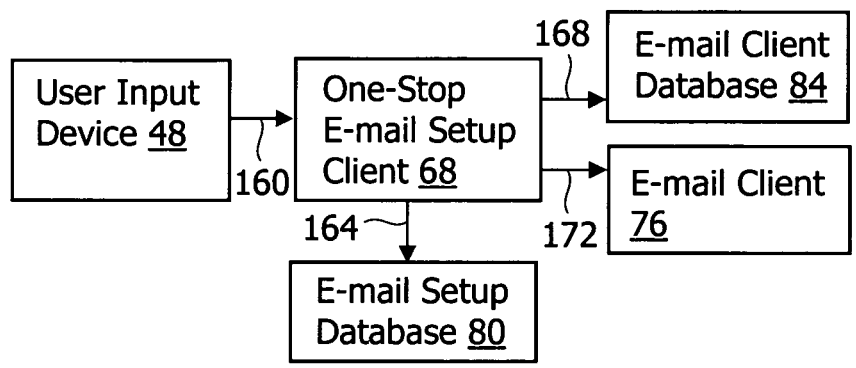
FIG. 8 depicts an embodiment of program control flows during the initial setup of the plurality of different e-mail account types using the one-stop e-mail setup client.

FIG. 8 is a program control flowchart depicting an embodiment of program control flows during the setup process for the plurality of different e-mail account types using the one-stop e-mail setup client 68. In the depicted embodiment, a first program control flow 160 occurs as a result of the user controlling, i.e., launching and providing setup information 92 to, the one-stop e-mail setup client 68 using the user input device 48. A second program control flow 164 occurs as a result of the one-stop e-mail setup client 68 controlling, i.e., querying and receiving setup information 92 from, the e-mail setup database 80. A third program control flow 168 occurs as a result of the one-stop e-mail setup client 68 controlling, i.e., writing the setup information 92 to, the e-mail client database 84. A fourth program control flow 172 occurs as a result of the one-stop e-mail setup client 68 controlling, i.e., launching, the e-mail client 76 as a result of completing the setup process for a particular e-mail account, i.e., completing the writing of the setup information 92 to the e-mail client database 84.

Figure 9:
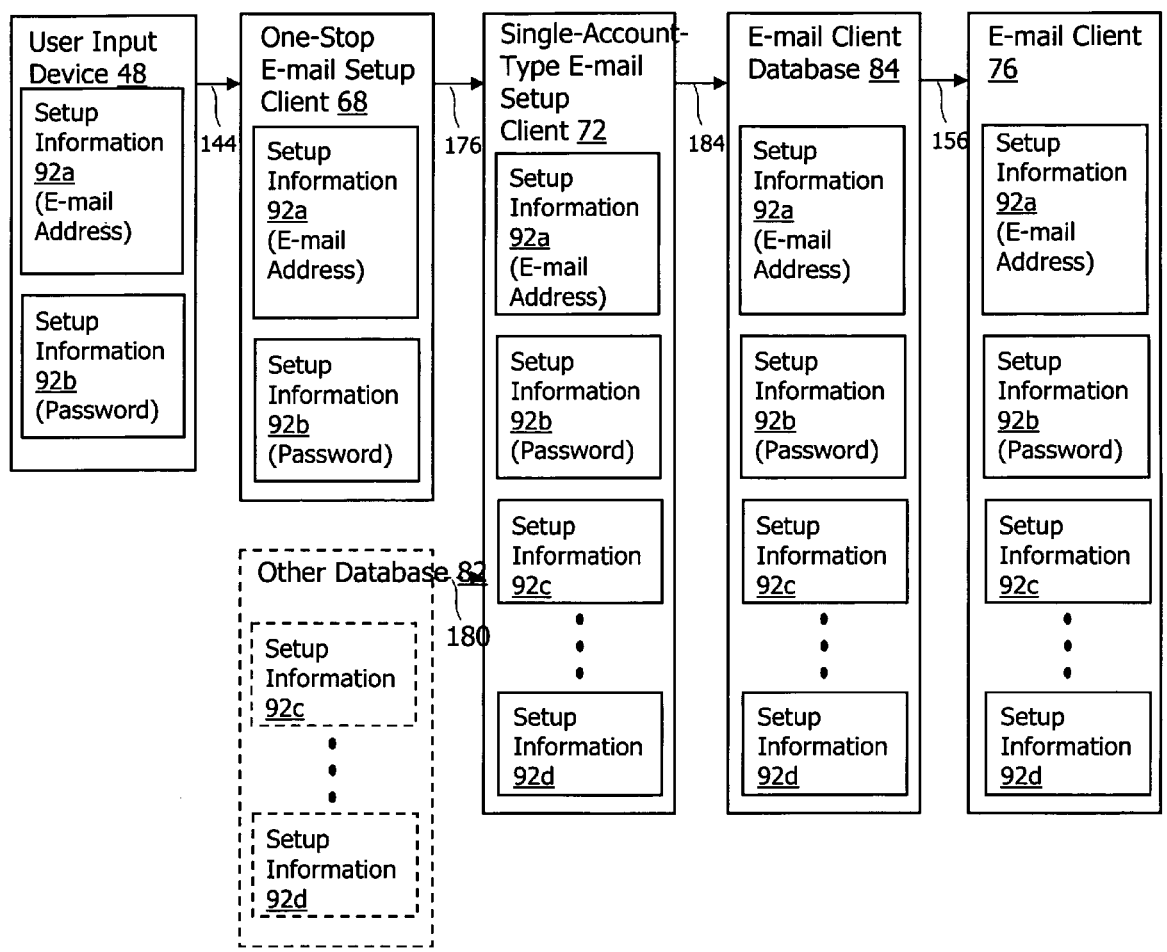
FIG. 9 depicts another embodiment of the data flows during the initial setup of the plurality of different e-mail account types using the one-stop e-mail setup client.

In the embodiments of FIGS. 7 and 8, the one-stop e-mail setup client 68 writes the setup information 92 directly to the e-mail client database 84. However, in another embodiment, the one-stop e-mail setup client 68 can be configured to communicate with, and utilize the functionality of, the plurality of single-account-type e-mail setup clients 72 depicted in FIG. 2. FIG. 9 is a data flowchart depicting one embodiment of data flows during such a setup process. The embodiment of FIG. 9 includes the first data flow 144 from the user input device 48 to the one-stop e-mail setup client 68 as also depicted in FIG. 7. A second data flow 176, including the e-mail address and password setup information 92a, 92b, occurs from the one-stop e-mail setup client 68 to the single-account-type e-mail setup client 72 as a result of the one-stop e-mail setup client 68 interfacing with the single-account-type e-mail setup client 72. An optional third data flow 180, including the plurality of additional pieces of setup information 92c, 92d, occurs from an optional other database 82 to the single-account-type e-mail setup client 72 as a result of the single-account-type e-mail setup client 72 performing e-mail account-setup related operations in response to instructions from the one-stop e-mail setup client 68. The optional other database 82 can be any database with which the single-account-type e-mail setup client 72 is configured to operate. Alternatively, the single-account-type e-mail setup client 72 may have access to additional setup information 92c, 92d internally. A fourth data flow 184, including the e-mail address and password setup information 92a, 92b and the plurality of additional setup information 92c, 92d, occurs from the single-account-type e-mail setup client 72 to the e-mail client database 84 as a result of the single-account-type e-mail setup client 72 performing setup operations in response to instructions from the one-stop e-mail setup client 68. A fifth data flow 156, the same as the fourth data flow 156 depicted in FIG. 7, including the e-mail address and password setup information 92a, 92b and the plurality of additional setup information 92c, 92d, occurs from the e-mail client database 84 to the e-mail client 76 as a result of the e-mail client 76 performing e-mail communication for an e-mail account created during the setup process for the plurality of different e-mail account types.

Figure 10:
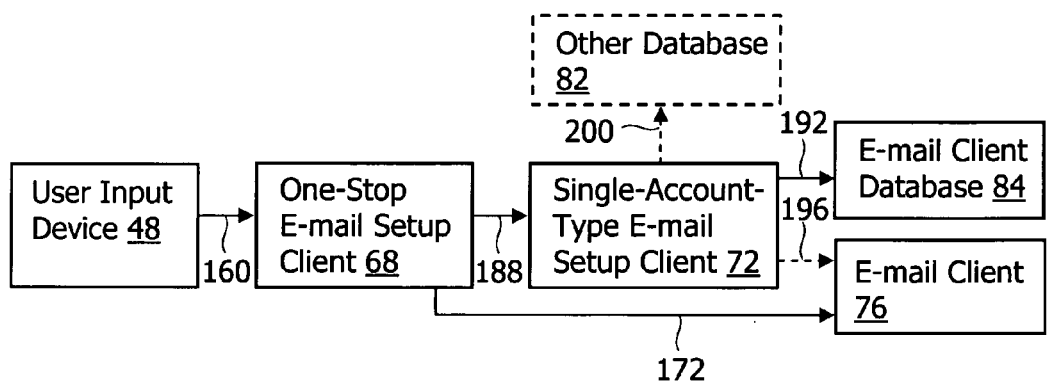
FIG. 10 depicts another embodiment of the program control flows during the initial setup of the plurality of different e-mail account types using the one-stop e-mail setup client.

FIG. 10 is a program control flowchart depicting one embodiment of program control flows during the setup process depicted in FIG. 9. In the depicted embodiment, a first program control flow 160, the same as depicted in FIG. 8, occurs as a result of the user controlling, i.e., launching and providing setup information 92 to, the one-stop e-mail setup client 68 using the user input device 48. A second program control flow 188 occurs as a result of the one-stop e-mail setup client 68 controlling, i.e., providing instructions and setup information 92 to, the single-account-type e-mail setup client 72. An optional third program control flow 200 occurs as a result of the single-account-type e-mail setup client 72 querying the other database 82 for, and being provided to by the other database 82, other setup information 92. A fourth program control flow 192 occurs as a result of the single-account-type e-mail setup client 72 controlling, i.e., writing the setup information 92 to, the e-mail client database 84. A fifth program control flow 172, the same as the fourth program control depicted in FIG. 8, can occur as a result of the one-stop e-mail setup client 68 controlling, i.e., launching, the e-mail client 76 as a result of the completion of the setup process for a particular e-mail account. Alternatively, instead of the fifth program control flow 172, an optional sixth (or more) program control flow 196 can occur as a result of the single-account-type e-mail setup client 72 controlling, i.e., launching, the e-mail client 76 as a result of the completion of the setup process for a specific e-mail account.

The setup of the plurality of e-mail account types using the one-stop e-mail setup client 68 can optionally include the data flows depicted in both FIGS. 7 and 9, as well as the program control flows depicted in both FIGS. 8 and 10. That is, the one-stop e-mail setup client 68 can be configured to both set up a first one or plurality of e-mail account types using the data flows and program control flows depicted in FIGS. 7 and 8, and set up a second one or plurality of e-mail account types in conjunction with one or a plurality of single-account-type e-mail setup clients using the data flows and program control flows depicted in FIGS. 9 and 10.

Other embodiments of the graphical user interface 96 presented to the user during the setup of the plurality of different e-mail account types, as well as the process of the setup of the plurality of different e-mail account types, are possible.

Figure 11:
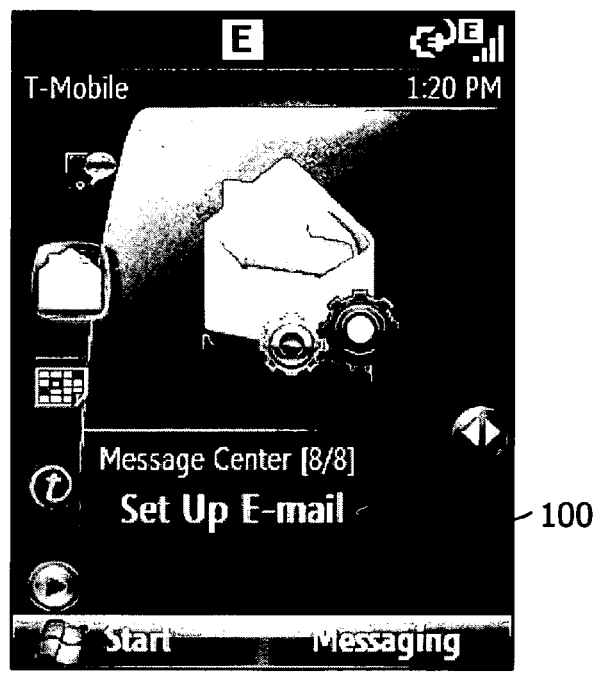
FIG. 11 depicts another embodiment of the graphical user interface displaying elements of the operating system.

FIG. 11 depicts another embodiment of the graphical user interface 96, previously depicted in FIG. 4, i.e., generated by the operating system prior to the launch of the one-stop e-mail setup client 68. The embodiment of FIG. 11 includes a plurality of top-level function selection elements, each of which can provide access to a second-level selection element that enables the user to select an action associated with a selected top-level function. For example, in FIG. 11, the user has selected the "Message Center" top-level function, and used the left- and right-arrow second-level selection element to select the "Set Up E-mail" (i.e., e-mail setup) launch element 100, the activation of which by the user launches the one-stop e-mail setup client 68.

Figure 12:
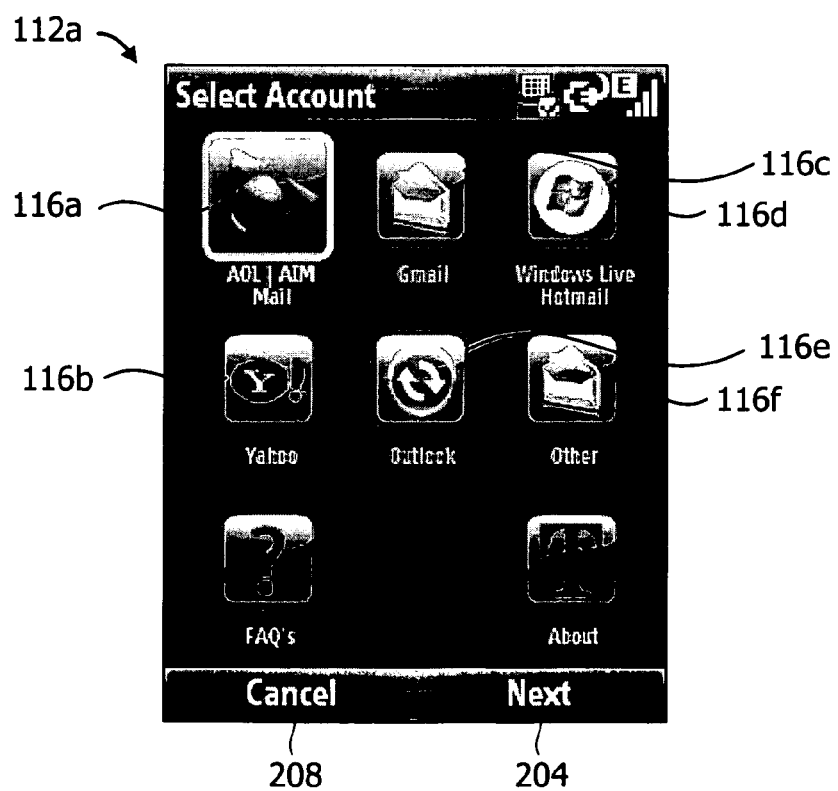
FIG. 12 depicts another embodiment of the graphical user interface displaying elements of the e-mail account-type selection interface of the one-stop e-mail setup client.

FIG. 12 depicts another embodiment of the e-mail account-type selection interface 112*a*, previously depicted in FIG. 5, including a plurality of the e-mail account-type selection elements 116*a*, 116*b*, 116*c*, 116*d*, 116*e*, 116*f*. In the depicted embodiment, the user is given the option to select among a plurality of e-mail account types, for example, but not limited to AOL/AIM Mail, Gmail, Windows Live Hotmail, Yahoo, Outlook, and/or other types of e-mail accounts. The user can select one of the e-mail account types by highlighting and activating the selection element 116 of the account type, or highlighting the account type and activating a "Next" control element 204. The user can also terminate the presentation of the account-type selection interface 112*a* by activating a "Cancel" control element 208.

FIGS. 13A, 13B and 13C depict another embodiment of the setup interface 120*a*, previously depicted in FIG. 6, displayed by the graphical user interface 96 in response to the selection by the user of the, for example, AOL/AIM Mail account-type selection element 116*a*. FIGS. 13A, 13B and 13C depict three separate screenshots 212, 216, 220 of the setup interface 120*a*, i.e., three portions 212, 216, 220 of the setup interface 120*a* displayed at different times by the graphical user interface 96. The number of separately-displayed portions of the setup interface 120 can vary, however. For example, the embodiment of FIG. 6 includes only a single portion. The separately-displayed setup interface portions 212, 216, 220 of FIGS. 13A, 13B and 13C, accomplish the functionality accomplished by the single setup interface portion of FIG. 6. Each of FIGS. 13A, 13B and 13C include a branding element 140*a* associated with AOL/AIM Mail, including a graphical symbol associated with AOL/AIM Mail.

FIG. 13A includes a first setup interface portion 212 having a disclaimer element 224 associated with the use of that particular type of e-mail account. The first setup interface portion 212 also includes a "Decline" control element 228 and an "Accept" control element 232. Activation of the "Decline" control element 228 terminates the presentation of the depicted setup interface 120*a*. Activation of the "Accept" control element 232 causes the graphical user interface 96 to display the second portion 216 of the setup interface 120*a*.

FIG. 13B depicts an embodiment of the second portion 216 of the setup interface 120*a*, which includes the e-mail address entry element 124 and the password entry element 128. The e-mail address entry element 124 can include a functionality to automatically suggest portions of the e-mail address. For example, e-mail addresses of a e-mail account type may all share a common portion, and the e-mail address entry element 124 can be configured to suggest the common portion to the user by displaying a suggested e-mail address portion 236 on the graphical user interface 96. The user can either accept or decline the suggested e-mail address portion 236 by interacting with the displayed suggested e-mail address portion 236. In one embodiment, an e-mail address can include a local portion and a domain portion. The local portion can also be a user name associated with the e-mail account. For example, the e-mail address being entered in FIG. 13B is "johndoe@aol.com", and "johndoe" can be the local portion, or user name, and "aol.com" can be the domain portion. The one-stop email setup client 68 can set up the plurality of different e-mail account types by receiving only the local portion (or user name) and password associated with the account. This can be achieved using, for example, the suggestion functionality of the e-mail address entry element 124 or other functionalities of the one-stop e-mail setup client 68. Note that in some embodiments, the local portion can be different than the user name and the one stop e-mail setup client 68 can be configured to use either the local portion or the user name, in conjunction with the password, to perform the setup of the plurality of different e-mail account types.

In FIG. 13B, the second setup interface portion 216 includes a password option element 240, which provides the user with an option to either set up the e-mail account such that the mobile communication device 24 will remember the entered password, or require the user to enter the password each time the e-mail client 76 performs e-mail communication in association with the set-up account. The second setup interface portion 216 also includes a "Back" control element 244, and a "Next" control element 136*a* that is an embodiment of the "Finish", i.e., execute setup, control element 136 previously depicted in FIG. 6. Activation of the "Back" control element 244 causes the graphical user interface 96 to return to the first setup interface portion 212. Activation of the "Back" control element 136*a* causes the one-stop e-mail setup client 68 to perform the e-mail account setup, of the particular selected account type, using the e-mail address and password entered by the user, and the graphical user interface 96 to display the third setup interface portion 220 of the setup interface 120a.

FIG. 13C depicts an embodiment of the third setup interface portion 220, which includes an message element 248 that communicates to the user that the setup process has been completed, and a "Finish" element 252 that upon activation causes the graphical user interface 96 to terminate execution of the setup interface 120a and launch the e-mail client 76.

In the depicted embodiments of the setup interface 120a of the one-stop e-mail setup client 68 of FIGS. 13A, 13B and 13C, for the setup of the AOL/AIM Mail account-type, the one-stop e-mail setup client 68 can be configured to operate according to the data flow of FIG. 7 and program control flow of FIG. 8.

Figure 14A:
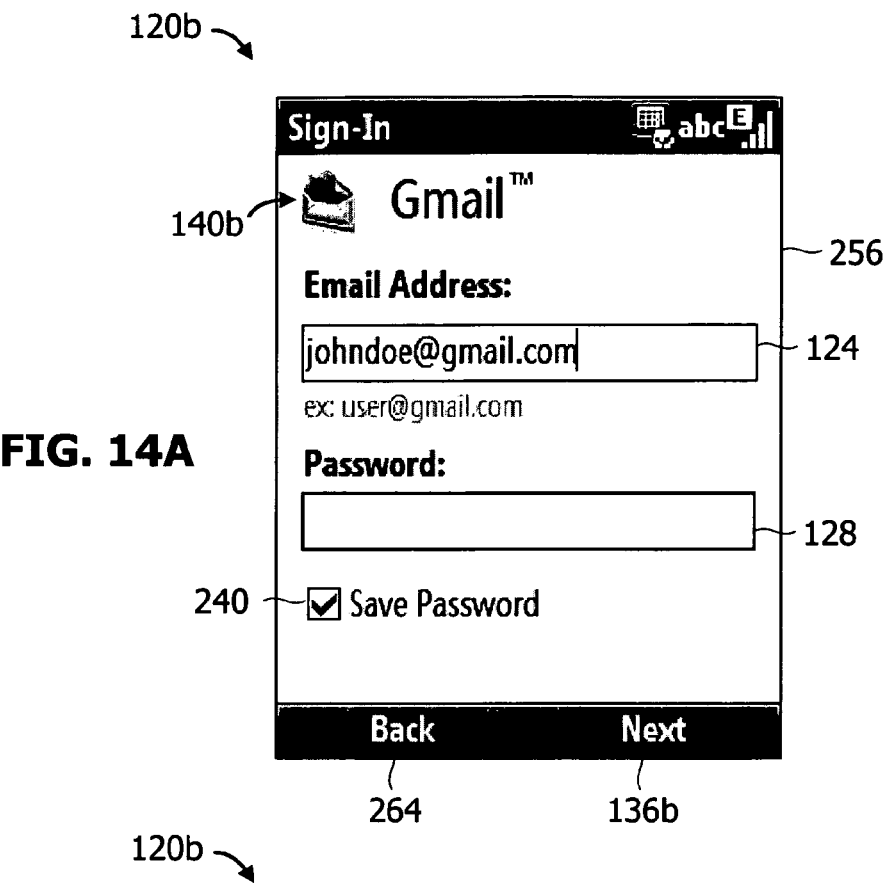
FIGS. 14A and 14B depict embodiments of the graphical user interface displaying elements of the setup interface of the one-stop e-mail setup client during a Gmail account-type setup.
Figure 14B:
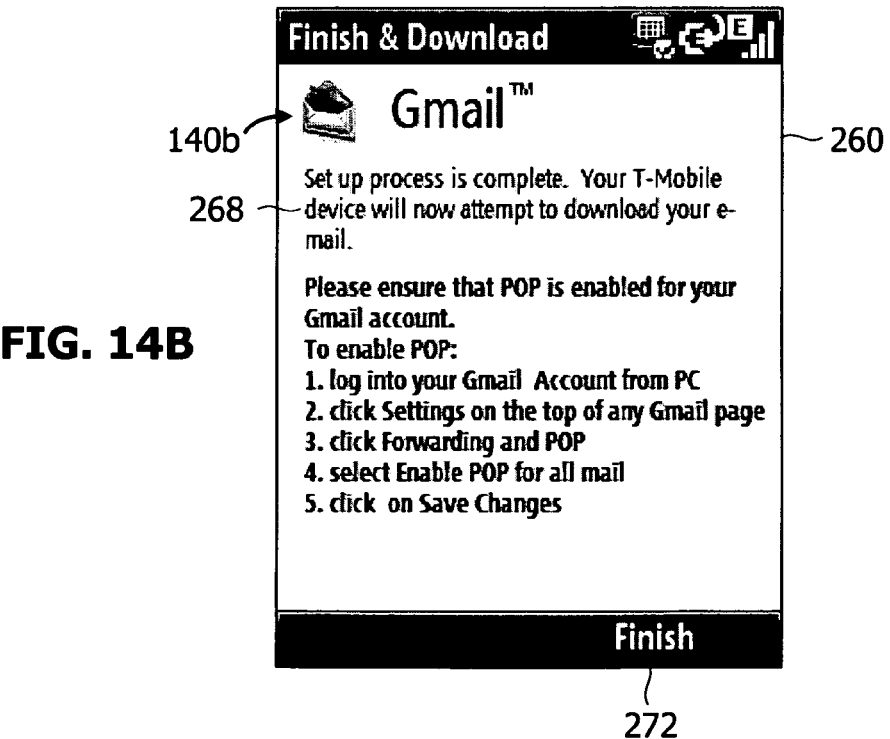

FIGS. 14A and 14B depict an embodiment of the setup interface 120b, which is displayed by the graphical user interface 96 in response to the selection by the user of the, for example, Gmail account-type selection element 116c. FIGS. 14A and 14B depict first and second portions 256, 260, respectively, of the depicted embodiment of the setup interface 120b associated with the selected e-mail account type. However, as discussed in regards to the embodiments of FIGS. 13A, 13B, and 13C, as well as FIG. 6, the number of separately-displayed portions of the setup interface 120 can vary. Each of FIGS. 14A and 14B include a branding element 140b associated with Gmail, including a graphical symbol that can be associated with this e-mail account type. The depicted first setup portion 256 of FIG. 14A includes the email address entry element 124, the password entry element 128, the "save password" option 240, a "Back" (i.e., cancel) control element 264 and a "Next" (i.e., execute setup) control element 136b that is an embodiment of the "Finish", i.e., execute setup, control element 136 previously depicted in FIG. 6. The depicted second setup portion of FIG. 14B includes a completion message 268 and a "Finish" control element 272 that terminates the execution of the setup interface 120b and launches the e-mail client 76.

In the depicted embodiments of the setup interface 120b of the one-stop e-mail setup client 68 of FIGS. 14A and 14B, for the setup of the Gmail account-type, the one-stop e-mail setup client 68 can be configured to operate according to the data flow of FIG. 7 and program control flow of FIG. 8.

Another embodiment of the setup interface (not shown), which may include a structure, for example, as depicted in FIG. 6, may be displayed by the graphical user interface 96 in response to the selection by the user of the, for example, Windows Live Hotmail account-type selection element 116d. For example, five portions, each in a respective one of five display screens of the setup interface associated with the selected e-mail account type, which may be, e.g., conventionally used display screens, may be provided. The number of separately-displayed portions of the setup interface can vary, however. The first setup portion may include a disclaimer element, an "Accept" control element and a "Reject" (i.e., "Decline") control element. The second setup interface portion may include the email address entry element 124, including an entry portion for the local part or user name of the e-mail address and a separate entry portion for the domain part of the e-mail address; the password entry element 128, the "save password" option, a "Cancel" (i.e., terminate the setup interface) control element and a "Next" control element.

Optional third and fourth portions of the setup interface may include setup information entry elements that enable the user to set more of the setup information associated with the e-mail account being set up. For example, a "The Live Search bar" element may provide an option to put a Search Bar on your home screen, which can be used to search the Internet for information by providing suitable key words; and a "Windows Live services" element may provide an option to create an entry on a home screen of the mobile communication device 24 that shows all Windows Live services (i.e., e-mail and Messenger) that are set-up, which can enable access to Windows Live Hotmail or your Windows Live Messenger right from the home screen without having to navigate several menus. Each of the optional third and fourth portions of the setup interface may also include the "Cancel" and "Next" control elements. A "Store Windows Live contacts" element may provide an option to merge a Windows Live Messenger online contact list with an address book in the mobile communication device 24, which enables the user to see if a buddy is online by showing the buddy's presence in the address book. A "Merge duplicates contacts" element provides the option to prevent duplicate entries that may already exist in an Outlook contact list during the merging process. Selection of a "Sync e-mail" element may instruct the one-stop e-mail setup client to synchronize e-mails and contacts between an online portion of the Windows Live Hotmail e-mail account and stored data on the mobile communication device 24.

The fifth setup portion may include a "Checking Internet Connectivity" message, a "Done" (i.e., "Finish") control element that finishes the execution of the setup interface and launches the e-mail client 76, and a "Cancel" control element.

In the described embodiment of the setup interface of the one-stop e-mail setup client 68 for the setup of the Windows Live Hotmail account-type, the one-stop e-mail setup client 68 can be configured to operate according to the data flow of FIG. 9 and program control flow of FIG. 10.

Figure 15A:
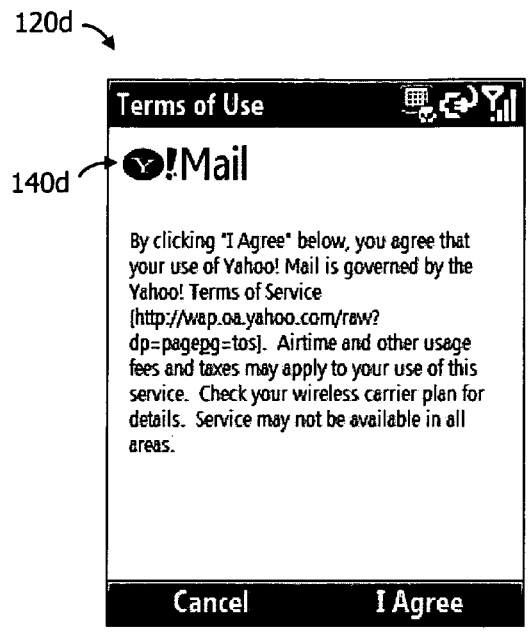
FIGS. 15A, 15B and 15C depict embodiments of the graphical user interface displaying elements of the setup interface of the one-stop e-mail setup client during a Yahoo Mail account-type setup.
Figure 15B:
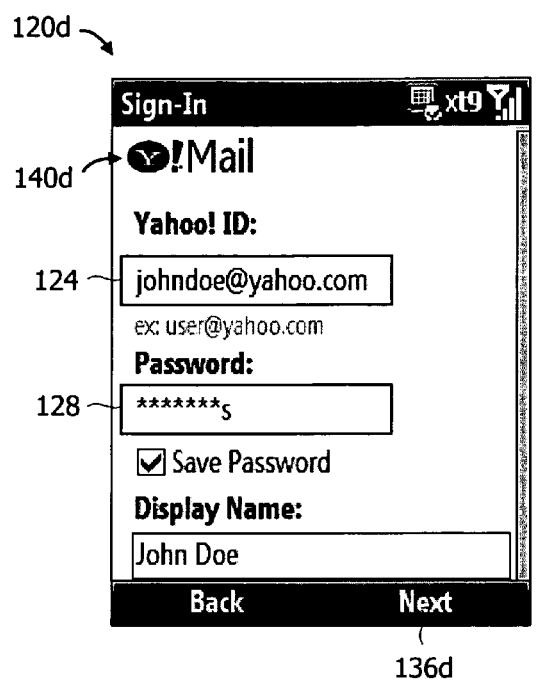
Figure 15C:
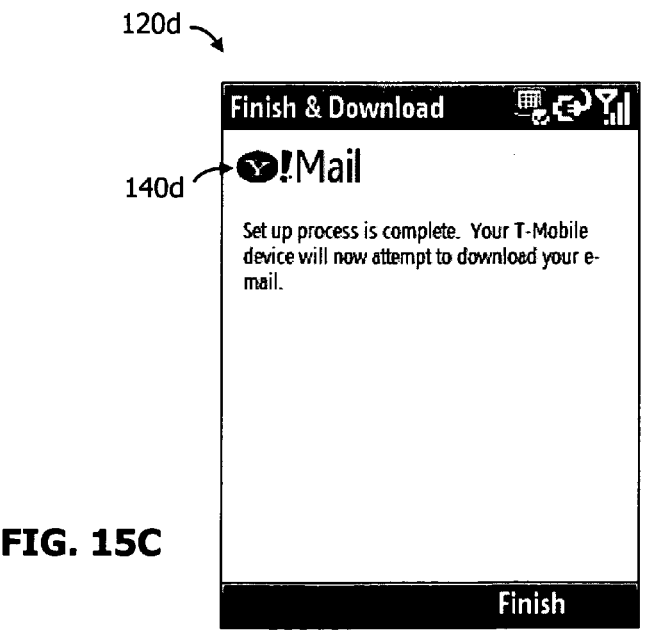

FIGS. 15A, 15B and 15C depict another embodiment of the setup interface 120d, which is displayed by the graphical user interface 96 in response to the selection by the user of the Yahoo account-type selection element 116b. FIGS. 15A, 15B and 15C depict first, second and third portions, respectively, of the depicted embodiment of the setup interface 120d associated with the selected e-mail account type. Each of FIGS. 15A, 15B and 15C include a branding element 140d associated with Yahoo, including a graphical symbol that can be associated with this e-mail account type. The depicted first setup interface portion of FIG. 15A includes a disclaimer element. The depicted second setup interface portion of FIG. 15B includes the email address entry element 124, the password entry element 128, a "save password" option, a "Back" (i.e., cancel) control element, a "Next" (i.e., execute setup) control element 136d and an optional additional setup information entry element which is a "Display Name" entry element. The depicted third setup portion of FIG. 15C includes a completion message and a "Finish" control element that terminates the execution of the setup interface 120d and launches the e-mail client 76.

In the depicted embodiments of the setup interface 120d of the one-stop e-mail setup client 68 of FIGS. 15A, 15B and 15C, for the setup of the Yahoo account-type, the one-stop e-mail setup client 68 can be configured to operate according to the data flow of FIG. 7 and program control flow of FIG. 8.

Figure 16A:
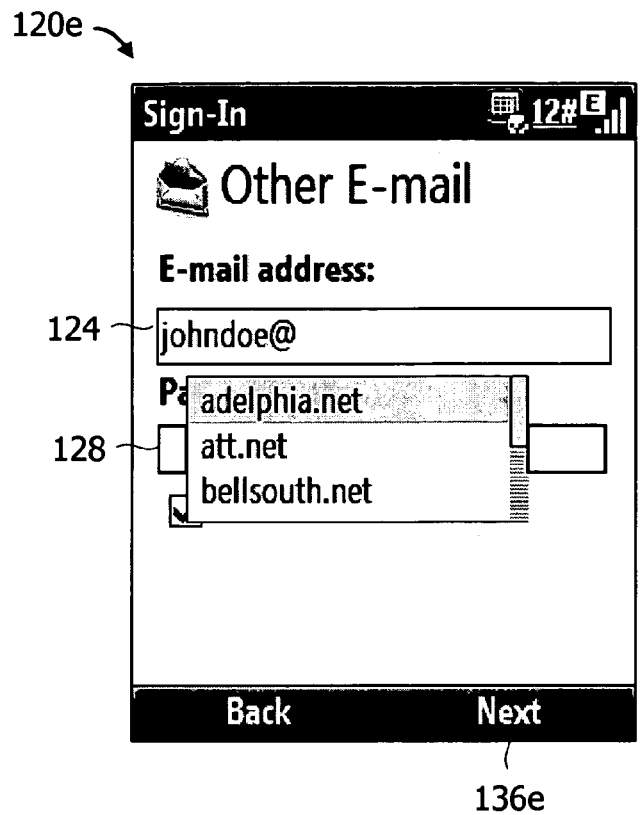
FIGS. 16A and 16B depict embodiments of the graphical user interface displaying elements of the setup interface of the one-stop e-mail setup client during an Other e-mail account-type setup.
Figure 16B:
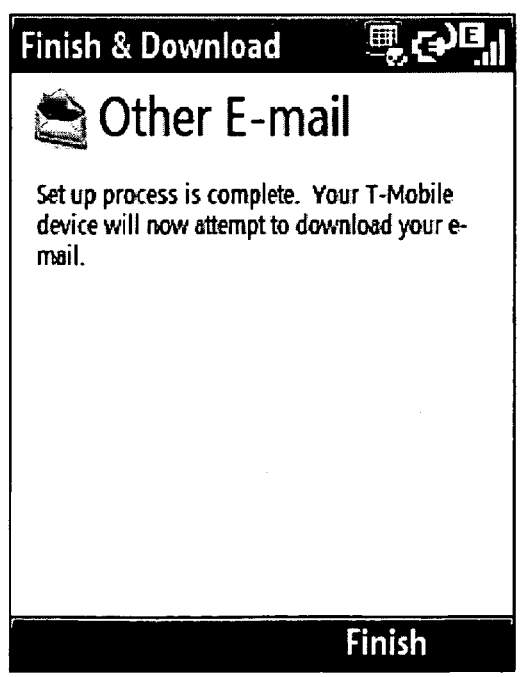

FIGS. 16A and 16B depict another embodiment of the setup interface 120e depicted in FIG. 6, which is displayed by the graphical user interface 96 in response to the selection by the user of the Other e-mail account-type selection element 116f. The Other e-mail account type is typically associated with e-mail account types other than the top few most popular e-mail account types. The e-mail setup database 80 can be configured to store setup information 92 for a plurality of different other e-mail account types that are accessed by the Other e-mail account type selection element 116f. FIGS. 16A and 16B depict first and second portions, respectively, of the depicted embodiment of the setup interface 120e associated with the selected e-mail account type. However, the number of separately-displayed portions of the setup interface can vary. The depicted first setup portion of FIG. 16A includes the email address entry element 124, the password entry element 128, a "save password" option, a "Back" (i.e., cancel) control element and a "Next" (i.e., execute setup process) control element 136e. In FIG. 16A, the e-mail address entry element 124 is configured to include an embodiment of the automatic suggestion functionality to automatically suggest portions of the e-mail address, as discussed in regards to FIG. 13B. The e-mail address entry element 128 can display the suggested e-mail address portion on the graphical user interface 96. The user can either accept or decline the suggested e-mail address portion by interacting with the displayed suggested e-mail address portion of the graphical user interface 96. In FIG. 16A, the displayed suggested e-mail address portion includes domain portions associated with the various e-mail account types having setup information 92 stored in the e-mail setup database 80.

The depicted second setup portion of FIG. 16B includes a completion message and a "Finish" control element that terminates the execution of the setup interface 120e and launches the e-mail client 76.

In the depicted embodiments of the setup interface 120e of the one-stop e-mail setup client 68 of FIGS. 16A and 16B, for the setup of the other e-mail account-type, the one-stop e-mail setup client 68 can be configured to operate according to the data flow of FIG. 7 and program control flow of FIG. 8.

Figure 17A:
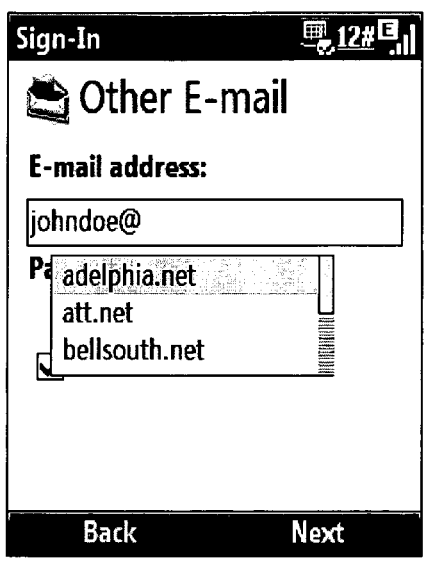
FIGS. 17A, 17B, 17C and 17D depict other embodiments of the graphical user interface displaying elements of the setup interface of the one-stop e-mail setup client during an Other e-mail account-type setup.
Figure 17B:
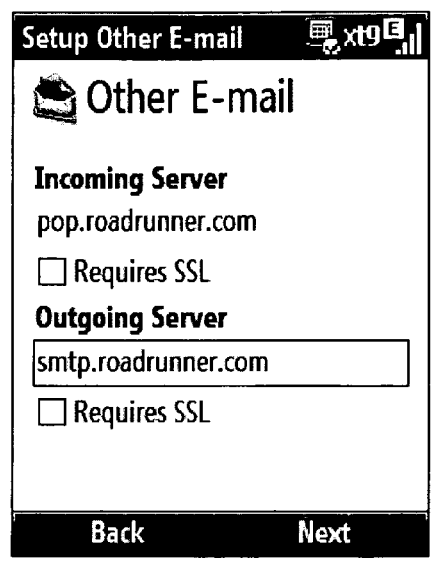
Figure 17C:
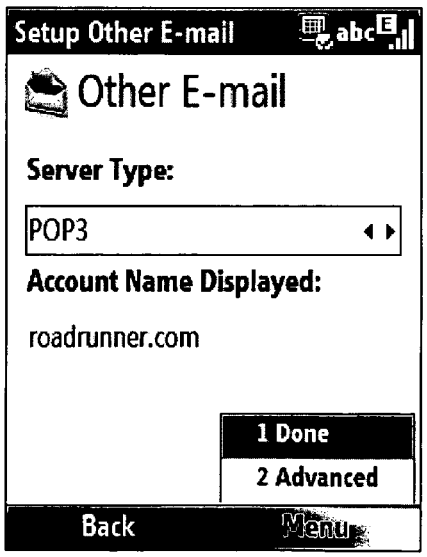
Figure 17D:
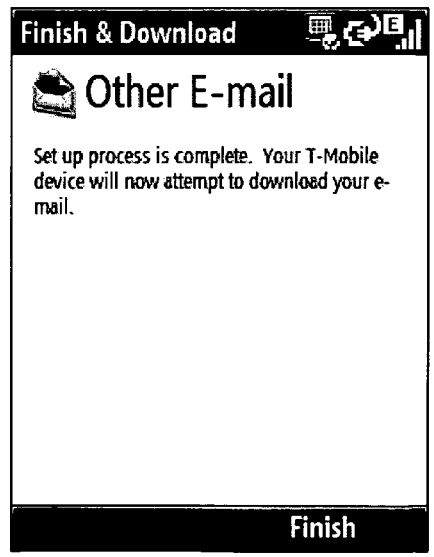

An embodiment of the one-stop e-mail setup client 68 sets up e-mail account types for which there is not already associated setup information 92 stored in the e-mail setup database 80. For these account types, the setup interface 120 can be configured to request all required setup information 92 from the user. This type of e-mail account setup is also accessed by selecting the Other e-mail account type selection element 116f. FIGS. 17A, 17B, 17C and 17D depict first, second, third and fourth portions of the setup interface 120f associated with Other e-mail account types not already detailed in the e-mail setup database 80. The first portion depicted in FIG. 17A and the fourth portion depicted in FIG. 17D are the same as the portions of the setup interface 120e depicted in FIGS. 16A and 16B. The second and third portions depicted in FIGS. 17B and 17C include additional setup information entry elements including an incoming e-mail server name entry element, an option to use SSL with the incoming e-mail, an outgoing e-mail server name entry element, an option to use SSL with the outgoing e-mail server, and an incoming e-mail server protocol entry element.

An embodiment of the one-stop e-mail setup client 68 provides the user with the option of saving pieces of setup information 92 in the e-mail setup database 80 in association with an e-mail account type not previously stored in the e-mail setup database 80. For example, the one-stop e-mail setup client 68 can be configured to provide the user with the option of saving the setup information 92 entered via the embodiment of the setup interface 120f depicted in FIGS. 17A, 17B, 17C and 17D into the e-mail setup database 80 in association with a new e-mail account type. Subsequently, the setup process for further e-mail accounts associated with the added e-mail account type can be accomplished with the embodiment of the setup interface 120e depicted in FIGS. 16A and 16B because the one-stop e-mail setup client 68 can subsequently access the required setup information 92 from the e-mail setup database 80.

Once the one-stop e-mail setup client 68 has set up a specific e-mail account, the user may also use the one-stop e-mail setup client 68 to modify setup information 92 stored for the set up account in the e-mail client database 84. Example embodiments of the present invention may display to the user display screens of the graphical user interface 96 during the process of modifying the setup information 92. For example, conventionally used display screens may be displayed for his purpose. The user can select from a first display screen a "Messaging" control element to launch a portion of the one-stop e-mail setup client 68 that is configured to modify the stored setup information 92. In a following display screen, the user can select a specific set up e-mail account and a "Settings" control element to access the setup information 92 stored for that particular account. In other display screens which follow the selection, the user can modify the e-mail address and the account display name for the account. In other display screens, the user can modify the incoming mail server name, the incoming e-mail server communication protocol, the user name and the password save functionality for the account. In other display screens, the user can modify the outgoing e-mail server name, an outgoing authentication option, an outgoing name and password option, an automatic send and receive setting, and a message download setting for the account. In another display screen, the user can modify a message format setting, a message download limit setting and a message attachment setting for the account.

Figure 18:
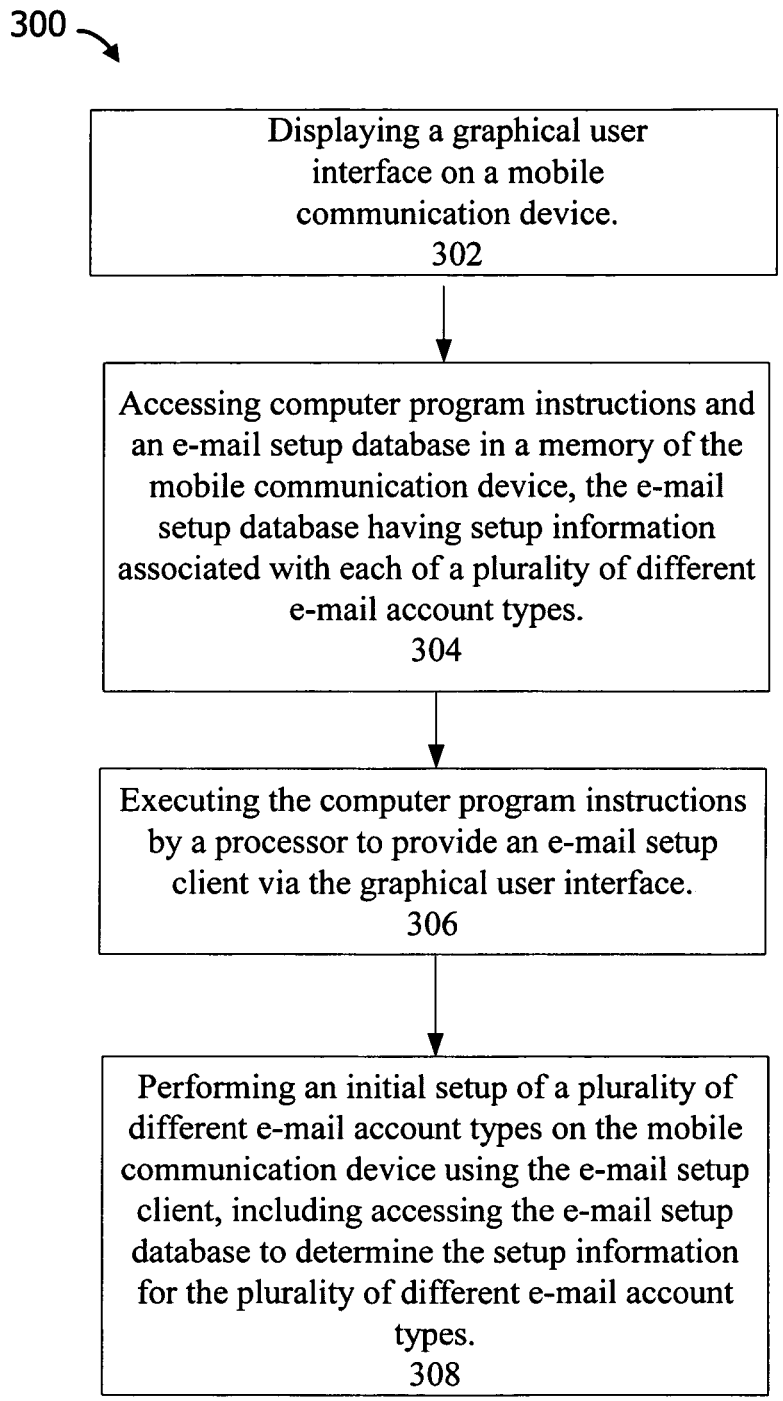
FIG. 18 depicts an embodiment of a method of performing the initial setup of the plurality of e-mail account types using the one-stop e-mail setup client.

FIG. 18 depicts an embodiment of a method 300. In a first step 302, the depicted method includes displaying the graphical user interface on the mobile communication device. In a second step 304, the depicted method includes accessing the computer program instructions and the e-mail setup database in a memory of the mobile communication device, the e-mail setup database having the setup information associated with each of the plurality of different e-mail account types. In a third step 306, the depicted method includes executing the computer program instructions by the processor to provide the e-mail setup client via the graphical user interface. In a fourth step 308, the depicted method includes performing the initial setup of the plurality of different e-mail account types on the mobile communication device using the e-mail setup client, including accessing the e-mail setup database to determine the setup information for the plurality of different e-mail account types.

In an example embodiment of the present invention, the described e-mail setup client may be loaded onto and operated by the device in addition to another e-mail setup client that is native to the device. For example, the device may include a native client for use to set up a particular e-mail account type, e.g., Hotmail or Outlook. For setting up an account of the type for which the native client is configured, a user may choose to use either the native client or the one stop e-mail setup client. For example, a separate selectable menu item may be provided for each. If the user chooses to use the one stop e-mail setup client, the one stop e-mail setup client may invoke the native client. The native client may thereafter take over interaction with the user for setting up the account. The one stop e-mail setup client may, however, hook into the setup procedure of the native client at various points, e.g., towards the end of the process to apply some changes which conform the account setup to the setup procedure used by the one stop e-mail setup client. For example, instead of requiring manual sending of an email, the one stop e-mail setup client may perform the function automatically.

Those skilled in the art can appreciate from the foregoing description that the present invention may be implemented in a variety of forms, and for a variety of mobile devices and communication systems. The various embodiments described herein may be implemented alone or in combination. While the embodiments of the present invention have been described via various embodiments, the true scope of the embodiments and/or methods of the present invention should not be so limited since other modifications will become apparent to the skilled practitioner upon a study of the drawings, specification, and the claims.

What is claimed is:

1. A mobile communication device, comprising:
a display configured to provide a graphical user interface;
a memory configured to store computer program instructions and a communication-setup database having setup information associated with each of a plurality of different communication account types,
a processor configured to execute the computer program instructions to provide a communication-setup client via the graphical user interface,
wherein the communication-setup client is configured to perform an initial setup of a plurality of different communication account types on the mobile communication device, and configured to access the communication-setup database to determine the setup information required for each of the plurality of different communication account types during the initial setup, and
wherein the plurality of different communication account types are e-mail account types that are associated with a plurality of different incoming mail server addresses in the communication-setup database, such that the communication-setup client is configured to provide a single application to perform the initial setup of the plurality of different communication e-mail account types by communicating with each of the plurality of e-mail account types, and
wherein the single application is adapted to communicate with each of the plurality of email account types by a single set of computer instructions independently executable by the processor from other computer instructions for the initial setup of the plurality of different communication e-mail account types.

2. The mobile communication device of claim 1, wherein the communication-setup database includes a plurality of different sets of setup information, each set of setup information being associated with a different one of the plurality of different communication account types.

3. The mobile communication device of claim 2, wherein the plurality of different communication account types are e-mail account types and each set of setup information includes a plurality of the following pieces of setup information: an incoming e-mail server address, an incoming e-mail server protocol, an incoming e-mail server port, an outgoing e-mail server address, an outgoing e-mail server protocol, and outgoing e-mail server port, an option indicating to use Secure Sockets Layer (SSL) when communicating with the incoming e-mail server, and option indicating to use SSL when communicating with the outgoing e-mail server, an option indicating whether the outgoing e-mail server requires authentication, an option indicating how often to check the incoming e-mail server for new e-mail, or an option indicating an amount of new e-mail to retrieve when there is new e-mail on the incoming e-mail server.

4. The mobile communication device of claim 1, wherein the plurality of different communication account types are e-mail account types that correspond to a plurality of different e-mail service providers including at least two or more of: AOL/AIM Mail, Gmail, Windows Live Hotmail, Outlook/Exchange/ActiveSync, and Yahoo.

5. The mobile communication device of claim 1, wherein the plurality of different communication account types are e-mail account types and the communication-setup client is configured to receive setup information including only a password and at least a portion of an e-mail address from the user during the setup of each of the plurality of different e-mail account types.

6. The mobile communication device of claim 5, wherein:
the communication-setup client prevents e-mail account setup information other than the password and the at least the portion of the e-mail address from being displayed by the graphical user interface during the initial setup of the plurality of different e-mail account types; and
the communication-setup client prevents e-mail account setup information other than the password and the at least the portion of the e-mail address from being entered by the user during the initial setup of the plurality of different e-mail account types.

7. The mobile communication device of claim 1, wherein the setup of the plurality of different communication account types sets up a plurality of different communication accounts on the mobile communication device, wherein the communication-setup client is configured to launch a communications client subsequent to the initial setup of each of the plurality of different communication account types, wherein the communications client is configured to perform a communication with the plurality of communication accounts; and
wherein the communication-setup client is configured to store the setup information accessed from the communication-setup database and the setup information received from the user in a communications client database that is configured to be accessed by the communications client when the communications client performs the communication with the plurality of communication accounts.

8. The mobile communication device of claim 7, wherein the plurality of different communication accounts are e-mail accounts and the communication is an e-mail communication.

9. The mobile communication device of claim 7, wherein editing of the setup information stored for each of the plurality of communication accounts in the communications client database subsequent to the initial setup of each of the plurality of different communication account types is enabled.

10. The mobile communication device of claim 1, wherein:
the communication-setup database includes a first portion which is permanently stored in the memory in form that is unalterable by the user; and
the communication-setup client is configured to receive from the user additional setup information for additional communication account types and store the additional setup information for the additional communication account types in a second portion of the communication-setup database.

11. The mobile communication device of claim 1, wherein the plurality of different communication account types includes at least one of an e-mail account type, a blog account type, an instant-messaging account type, and a social-networking account type.

12. A method comprising:
displaying a graphical user interface on a mobile communication device;

storing computer program instructions and a communication-setup database in a memory of the mobile communication device, the communication-setup database having setup information associated with each of a plurality of different communication account types;

executing the computer program instructions by a processor to provide a communication-setup client via the graphical user interface; and performing an initial setup of a plurality of different communication account types on the mobile communication device using the communication-setup client, including accessing the communication-setup database to determine the setup information required for the plurality of different communication account types, wherein the plurality of different communication account types are e-mail account types that are associated with a plurality of different incoming mail server addresses in the communication-setup database, such that the communication-setup client is configured to provide a single application to perform the initial setup of the plurality of different communication e-mail account types by communicating with each of the plurality of e-mail account types;

wherein the single application is adapted to communicate with each of the plurality of email account types by a single set of computer instructions independently executable by the processor from other computer instructions, for the initial setup of the plurality of different communication e-mail account types.

13. The method of claim 12, wherein the communication-setup database includes a plurality of different sets of setup information, each set of setup information being associated with a different one of the plurality of different communication account types.

14. The method of claim 13, wherein the plurality of different communication account types are e-mail account types and each set of setup information includes a plurality of the following pieces of setup information: an incoming e-mail server address, an incoming e-mail server protocol, an incoming e-mail server port, an outgoing e-mail server address, an outgoing e-mail server protocol, an outgoing e-mail server port, an option indicating to use Secure Sockets Layer (SSL) when communicating with the incoming e-mail server, an option indicating to use SSL when communicating with the outgoing e-mail server, an option indicating whether the outgoing e-mail server requires authentication, an option indicating how often to check the incoming e-mail server for new e-mail, or an option indicating an amount of new e-mail to retrieve when there is new e-mail on the incoming e-mail server.

15. The method of claim 12, wherein the plurality of different communication account types are e-mail account types that correspond to a plurality of different e-mail service providers including at least two of: AOL/AIM Mail, Gmail, Windows Live Hotmail, Outlook/Exchange/ActiveSync, and Yahoo.

16. The method of claim 12, wherein the plurality of different communication account types are e-mail account types and the method further comprises:

receiving setup information including only a password and at least a portion of an e-mail address from the user during the setup of each of the plurality of different e-mail account types.

17. The method of claim 16, further comprising:
preventing e-mail account setup information other than the password and the at least the portion of the e-mail address from being displayed by the graphical user interface during the initial setup of the plurality of different e-mail account types; and preventing e-mail account setup information other than the password and the at least the portion of the e-mail address from being entered by the user during the initial setup of the plurality of different e-mail account types.

18. The method of claim 12, wherein the initial setup of the plurality of different communication account types sets up a plurality of different communication accounts on the mobile communication device, the method further comprises:

launching a communications client subsequent to the initial setup of each of the plurality of different communication account types, wherein the communications client is configured to perform a communication with the plurality of communication accounts; and storing the setup information accessed from the communication-setup database and the setup information received from the user in a communications client database that is configured to be accessed by the communications client when the communications client performs the communication with the plurality of communication accounts.

19. The method of claim 18, wherein the plurality of different communication accounts are e-mail accounts and the communication is an e-mail communication.

20. The method of claim 18, further comprising editing by the user the setup information stored for each of the plurality of communication accounts in the communications client database subsequent to the initial setup of each of the plurality of different communication account types.

21. The method of claim 12, wherein the communication-setup database includes a first portion which is permanently stored in the memory in a form that is unalterable by the user, the method further comprising:

receiving from the user additional setup information for additional communication account types; and storing the additional setup information for the additional communication account types in a second portion of the communication-setup database.

22. The method of claim 12, wherein the plurality of different communication account types includes at least one of an e-mail account type, a blog account type, an instant-messaging account type, and a social-networking account type.

23. A computer-readable non-transitory medium having stored thereon instructions executable by a processor, the instructions which when executed cause the processor to perform a method, the method comprising:

displaying a graphical user interface on a mobile communication device;

providing a communication-setup client via the graphical user interface; and performing an initial setup of a plurality of different communication account types on the mobile communication device using the communication-setup client, the initial setup including determining setup information required for the plurality of different communication account types, the determination being made by accessing a communication-setup database which has respective setup information associated with each of the plurality of different communication account types, such that the communication-setup client is configured to provide a single application to perform the initial setup of the plurality of different communication e-mail account types by communicating with each of the plurality of e-mail account types;

wherein the single application is adapted to communicate with each of the plurality of email account types by a single set of computer instructions independently executable by the processor from other computer instructions, for the initial setup of the plurality of different communication e-mail account types.

* * * * *